United States Patent  (10) Patent No.: US 6,757,641 B1
Immer et al.  (45) Date of Patent: Jun. 29, 2004

(54) MULTI SENSOR TRANSDUCER AND WEIGHT FACTOR

(75) Inventors: Christopher D. Immer, Merritt Island, FL (US); John Lane, Melbourne, FL (US); Anthony J. Eckhoff, Cocoa, FL (US); Jose M. Perotti, Merritt Island, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 49 days.

(21) Appl. No.: 10/185,830

(22) Filed: Jun. 28, 2002

(51) Int. Cl.$^7$ ................................................ G06F 15/00
(52) U.S. Cl. ...................................... 702/194; 702/199
(58) Field of Search ................................ 702/101, 150, 702/179, 190, 191, 194, 199; 700/45; 600/481; 60/277, 285; 340/573

(56) References Cited

U.S. PATENT DOCUMENTS

| | | |
|---|---|---|
| 3,630,079 A | 12/1971 | Hughes et al. |
| 4,105,900 A | 8/1978 | Martin et al. |
| 4,631,693 A | 12/1986 | Neri |
| 4,926,364 A * | 5/1990 | Brotherton .................. 702/179 |
| 5,012,424 A | 4/1991 | Dodson |
| 5,148,378 A | 9/1992 | Shibayama et al. |
| 5,220,519 A | 6/1993 | Eller |
| 5,353,190 A | 10/1994 | Nakayama et al. |
| 5,377,128 A | 12/1994 | McBean |
| 5,479,161 A | 12/1995 | Keyes et al. |
| 5,570,300 A | 10/1996 | Henry et al. |
| 5,604,683 A | 2/1997 | Roecker |
| 5,754,963 A | 5/1998 | Nunneley et al. |
| 5,774,378 A | 6/1998 | Yang |
| 5,902,351 A | 5/1999 | Streit et al. |
| 5,960,381 A | 9/1999 | Singers et al. |
| 5,978,743 A | 11/1999 | Kiyono |
| 6,019,086 A | 2/2000 | Schneider et al. |
| 6,098,011 A | 8/2000 | Scott |
| 6,148,273 A | 11/2000 | Maeda |
| 6,502,063 B1 * | 12/2002 | Eriksson et al. ............ 702/190 |

OTHER PUBLICATIONS

Horowitz and Hill, "The Art of Electronics", 1989, Cambridge University Press, p. 635–636.*

* cited by examiner

*Primary Examiner*—John Barlow
*Assistant Examiner*—Stephen J. Cherry
(74) *Attorney, Agent, or Firm*—Randall M. Heald; Gary G. Borda; John G. Mannix

(57) ABSTRACT

A multi-sensor transducer and processing method allow insitu monitoring of the senor accuracy and transducer 'health'. In one embodiment, the transducer has multiple sensors to provide corresponding output signals in response to a stimulus, such as pressure. A processor applies individual weight factors to reach of the output signals and provide a single transducer output that reduces the contribution from inaccurate sensors. The weight factors can be updated and stored. The processor can use the weight factors to provide a 'health' of the transducer based upon the number of accurate versus in-accurate sensors in the transducer.

15 Claims, 3 Drawing Sheets

MULTI SENSOR TRANSDUCER AND WEIGHT FACTOR

ORIGIN OF INVENTION

The invention described herein was made in the performance of work under NASA contract and by an employee of the United States Government and is subject to the provisions of Public Law 96-517 (35 U.S.C. §202) and may be manufactured and used by or for the Government for governmental purposes without payment of any royalties thereon or therefore. In accordance with 35 U.S.C. §202, the Contractor has elected not to retain title.

FIELD OF THE INVENTION

The present invention relates generally to transducers and in particular the present invention relates to determining a health state of transducers.

BACKGROUND OF THE INVENTION

A transducer is a device that provides an output signal calibrated to a monitored stimulus, such as temperature or pressure. The relationship between the output and the monitored stimulus is designed to remain relatively stable. As the transducer ages, however, the transducer 'health' changes and the input/output calibration may change.

There are many approaches to determine the health of a transducer. A healthy transducer is one that is reporting accurate output measurements. An unhealthy transducer is one that is either inoperable or reporting erroneous measurements not corresponding to the input stimulus it is receiving. Catastrophic failures of a transducer are obvious: either the sensor reports no value or it reports a value that is completely untenable. These cases are easily detected. The more subtle case to prevent is where the sensor drifts, or its calibration changes, and the user has no way to determine whether the sensor is bad or the stimulus has changed.

The canonical way to ensure a sensor's accuracy is to compare that sensor with another. It may possibly be compared to a "transfer standard" that is known to be very stable and agree well with other standards. Regardless, in comparing the questionable sensor with another, known to be healthy, the user can determine the health of the sensor. After determining the state of the sensor's health, then corrective action could be taken, such as repair or recalibration. Of course, this technique only works if at least one of the sensors is actually known to be accurate. When two arbitrary sensors are subjected to the same stimulus, if they report differing values it is unclear which is right and which is wrong.

For the reasons stated above, and for other reasons stated below which will become apparent to those skilled in the art upon reading and understanding the present specification, there is a need in the art for determining a health of one or more transducers.

SUMMARY OF THE INVENTION

The above-mentioned problems with transducers and other problems are addressed by the present invention and will be understood by reading and studying the following specification.

In one embodiment, a transducer comprises a plurality of sensors to provide a plurality of corresponding output signals in response to a stimulus, and a processor to apply a plurality of weight factors to each of the plurality of corresponding output signals and provide a single transducer output.

In another embodiment, a transducer comprises a plurality of sensors to provide a plurality of corresponding output signals in response to a stimulus, a memory to store a plurality of weight factors corresponding to the plurality of sensors, and a processor to apply a plurality of weight factors to each of the plurality of corresponding output signals and provide a single transducer output. A multiplex circuit selectively couples the plurality of corresponding output signals to the processor.

A method of providing an output from a multiple sensor transducer comprises sampling an output signal from each of the multiple sensors, and determining a weight factor for each sensor based upon the sampled output signals. The weight factor represents an accuracy level of the corresponding sensor. A single output signal is calculated by applying the weight factors to the sampled output signals. In one embodiment, the weight factors are calculated by the following algorithm, $$(W_i)^{-1} = \frac{1}{2N} \sum_{j=1}^{N} \left( \frac{x_i}{x_j} + \frac{x_j}{x_i} \right)$$

where N is the number of sensors, $W_i$ is the corresponding weight factor for sensor i providing output signal $x_i$. The single output signal, Xoutput, can be calculated by the following algorithm, $$X_{output} = \frac{\sum_{i=1}^{N} x_i W_i}{\sum_{j=1}^{N} W_j}.$$

DETAILED DESCRIPTION OF THE DRAWINGS

Figure 1:
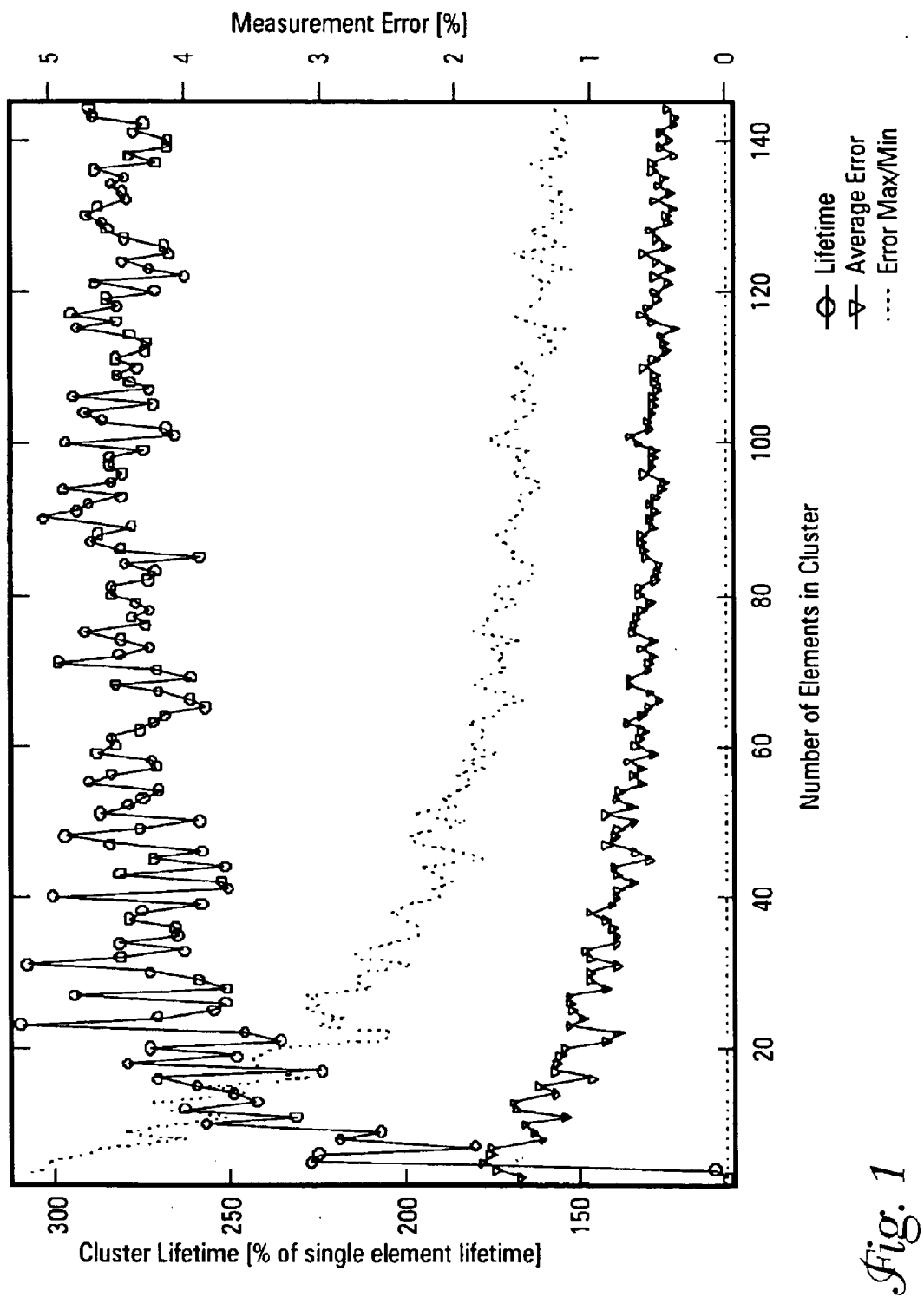
FIG. 1 is a graph of a simulation of a multi sensor array algorithm of an embodiment of the present invention with an increasing number of elements in a cluster.

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

As stated above, the health of a sensor or transducer is difficult to determine without removing the transducer from its application and comparing its operation to a known healthy transducer. In applications were multiple sensors can be used, the outputs of the sensors could be compared. Increasing the number of sensors and obtaining agreement between all the elements would increase confidence in the measurement. If sensor failures are rare, then failures could be easily picked out from the measurement cluster as those outliers that do not agree with the most-common value (the mode). Merely averaging of all the sensors values is not the best answer, because aberrant sensors may skew the average and the true output value would not be known. While there are numerous techniques to determine reliability in a group of measurements, an embodiment of the present invention provides a unique algorithm that takes input from multiple sensors and determines which are trustworthy and which are questionable.

A common metrological practice is to use two measurement standards and monitor the ratio of their outputs. If the ratio ever changes, then one of the two sensors has failed, and both are re-calibrated (presumably by some other "true" standard). Embodiments of the present invention generalize this technique from two sensors to N sensors.

The generalization of the ratio method can be implemented by taking the sum of the ratio of every element to every other element and then use this to determine a confidence level or weight of that particular element. If the measurement of sensor i is given by $x_i$ then:

$$(W_i)^{-1} = \frac{1}{N} \sum_{j=1}^{N} \frac{x_i}{x_j} \qquad [2.1]$$

Where $W_i$ is the weight applied to sensor i and N is the number of elements in the cluster. The reason that this sum is the inverse weight will become evident later on. If all N sensors agree perfectly, then equation [2.1] should be equal to 1 for each element. If a single element disagrees with the others, then depending on whether the element is less than or greater than the other element, the weight will be different. Ideally the weight should be equal whether the ratio is greater than one or less than 1. So equation [2.1] is modified further to:

$$(W_i)^{-1} = \frac{1}{2N} \sum_{j=1}^{N} \left( \frac{x_i}{x_j} + \frac{x_j}{x_i} \right) \qquad [2.2]$$

Notice that the weights given by equation [2.2] are symmetric whether the ratio is greater than or less than one. After calculating these weights, the output of the sensor cluster is given by:

$$X_{output} = \frac{\sum_{i=1}^{N} x_i W_i}{\sum_{j=1}^{N} W_j} \qquad [2.3]$$

In an implementation of the "ratio-inverse ratio" algorithm [2.2], it is very easy to keep a running sum of the weights, $(W_i)^{-1}$, for each sensor after each measurement. The running sum can be used for the weight in place of the weight for a single measurement. In this matter, a history for each sensor is kept. A sensor that continually fails will gradually have a smaller weight and eventually will be only minimally included in the output of the sensor cluster. By doing so, the cluster "learns" which sensors to trust and which not to trust.

As an example, consider a cluster of N elements. Let the measurement of N−1 elements of the cluster agree exactly and let the $k^{th}$ one differ from the other N−1. In this case, the weight for each of the N−1 elements is:

$$(W_{i \neq k})^{-1} = \frac{1}{2N} \left( \frac{x_{i \neq k}}{x_k} + \frac{x_k}{x_{i \neq k}} \right) + \frac{1}{2N} \sum_{\substack{j=1 \\ j \neq i}}^{N} \left( \frac{x_{i \neq k}}{x_j} + \frac{x_j}{x_{i \neq k}} \right) \qquad [2.4]$$

$$= \frac{1}{2N} \left( \frac{x_{i \neq k}}{x_k} + \frac{x_k}{x_{i \neq k}} \right) + \frac{1}{2N} \sum_{\substack{j=1 \\ j \neq i}}^{N} (1 + 1)$$

$$= \frac{1}{2N} \left( \frac{x_{i \neq k}}{x_k} + \frac{x_k}{x_{i \neq k}} \right) + \frac{(N-1)}{N}$$

And the Weight of the $k^{th}$ element is:

$$(W_k)^{-1} = \frac{1}{2N} \sum_{\substack{i=1 \\ i \neq k}}^{N} \left( \frac{x_i}{x_k} + \frac{x_k}{x_i} \right) + \frac{1}{N} \qquad [2.5]$$

Now define the ratio-inverse ratio of the $k^{th}$ element to be:

$$R_k \equiv \left( \frac{x_{i \neq k}}{x_k} + \frac{x_k}{x_{i \neq k}} \right) \qquad [2.6]$$

And so the weight of the non-$k^{th}$ element from equation [2.4] becomes:

$$(W_{i \neq k})^{-1} = \frac{R_k}{2N} + \frac{(N-1)}{N} \qquad [2.7]$$

And so equation [2.5] becomes:

$$(W_k)^{-1} = \frac{(N-1)R_k}{2N} + \frac{1}{N} \qquad [2.8]$$

So that $$W_k = \frac{2N}{(N-1)R_k + 2} < W_{i \neq k} = \frac{2N}{R_k + 2(N-1)} \qquad [2.9]$$

When $$(N-1)R_k + 2 > R_k + 2(N-1) \qquad [2.10]$$

or $$R_k > 2$$

Which is always true. This means that the $k^{th}$ element will always be weighted less than the others that agree. That is the goal of discriminating the healthy sensors from the unhealthy sensors.

In implementing the ratio-inverse ratio algorithm, all elements are included in the output of the cluster. There should be some criteria to know when the total cluster has "failed". The algorithm outlined here works by comparing sensors with each other. It depends on the fact that there are a majority of sensors that agree with each other. It is clear that if out of N sensors, there are no two that agree (within some pre-defined "element rejection tolerance"), then there is no way of knowing the reliability of any of the sensors. Therefore, in one embodiment of the algorithm, when there are less than three sensors that agree, the cluster has failed. This determination can be made easily by setting a certain limit on the weight, equation [2.2], for each sensor. When there are less than three sensors with a weight, $W_i$, greater than some predetermined limit, then the cluster ahs failed.

The algorithm outlined above can be applied to any group of sensors. In order to have adequate control and test this algorithm in a timely manner, a Monte Carlo technique was implemented. In this technique an independent random value was generated for each element to represent a measurement. The generated measurements were then fed into the Multi-Sensor Array algorithm to test it. After a pre-defined period of time, any given element fails and the algorithm distinguishes those that have failed from the otherwise randomly distributed noise in the measurements. One advantage with this simulation is that the performance of the algorithm can be really tested because the failure of the sensors can be controlled and is known.

In the simulation, a "measurement" of an individual element has a Gaussian (or Normal) distribution about a mean of 100 with a standard deviation of 1. Each element has a randomly picked lifetime exponentially distributed with an average of 5000 measurements. After every measurement, the sensors lifetime is decremented by one. When a sensor's lifetime reaches zero it undergoes a "failure" that is simulated by allowing its mean to change by a random amount up to ±10% of its current value and its standard deviation to increase by a random amount of up to 10% of its current value. After a failure, a new lifetime for that element is randomly chosen and the process repeats. In this manner, the sensor will "drift" and become noisier with time.

Clearly, more sensors in the cluster result in better statistics, so that the advantages of the algorithm is apparent with larger numbers. FIG. 1 shows the results of the simulation as the number of sensors in the cluster increases. The lifetime of the cluster asymptotically approaches 275% of the average lifetime of a single element. This behavior is almost saturated by about 20 elements in the cluster. To maximize lifetime for these parameters, there is not much advantage to more than 20 elements in the cluster. In FIG. 1 it can also be seen that both the maximum and the average error from the actual measurement (a luxury afforded by the simulation) decrease as the number of elements in the cluster increases. Towards the larger number of elements, the average error even dips below the error for a single element, 1%.

In embodiments of the present invention it is possible to feedback some error bands and remaining lifetime to the user and allow the user to decide a course of action. For example, if it was known that 30 out of 100 sensors have "failed" and that the resulting cluster will only report a measurement within ±5%, the user can decide whether that uncertainty is tolerable or to replace/recalibrate the sensor. At a later time, when 70 out of 100 sensors have "failed" and the error band has increase to ±10%, the user may decide that the sensor needs to be replaced. In this manner, the user has the option to trade lifetime for reliability in a formal manner. In applications where replacing the sensor is not an option, the user will still have a measurement albeit with an increasing error band.

Figure 2:
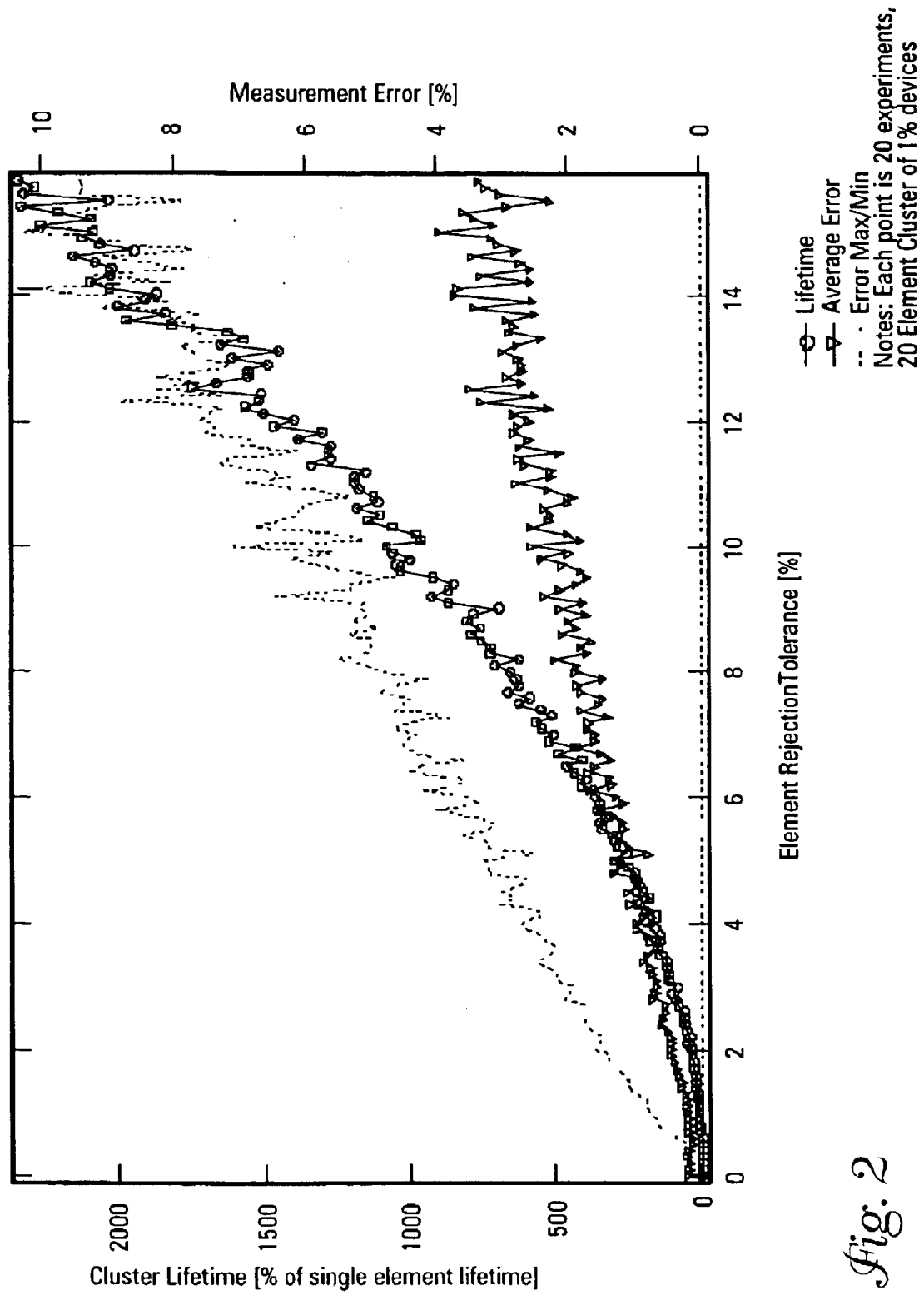
FIG. 2 is a graph of a simulation of a multi sensor array algorithm of an embodiment of the present invention with an increasing rejection tolerance.

FIG. 2 shows results of the Monte Carlo simulation as the "rejection" parameter increases. This rejection parameter is the number that decides when an individual sensor has "failed". The cluster fails when the algorithm decides there are less than three reliable sensors. Not surprisingly, with increasing rejection tolerance, both the lifetime and the error bands increase. Increasing this parameter is an excellent way to increase the calibration cycle easily if the user decides a larger confidence band is acceptable.

The positive results from the Monte Carlo simulation indicate that the ratio-inverse ratio algorithm described above allows successful monitoring of the health of transducers. The simulation is probably one of the strongest proofs of the algorithm because, in an actual device for testing purposes, it is difficult to know whether a given element has actually ailed without disturbing the system, and it is also difficult to know the actual stimulus (There must be some "standard" to compare to). When applying the algorithm to a specific set of devices, it is imperative to thoroughly study the failure mechanisms of the elements, model those mechanisms in the Monte Carlo, and test the algorithm's performance with those elements.

Given that the method is sound, one symbiotic technology for this algorithm is Micro-Electro-Mechanical Systems, MEMS. MEMS technology is well established in the sensors industry. These sensors are produced by the same bulk production methods as silicon: there are hundreds of virtually identical elements fabricated on a single die. Currently the manufacturers cut the individual elements apart to make separate sensors. It would be very easy to stop that process in the die-cutting stage and make sensors with multiple elements in one package. This is the perfect front end for the ratio-inverse ratio algorithm.

Apart from the bulk production capabilities, MEMS sensor clusters have other numerous advantages. One of the underlying assumptions of any sensor array algorithm is that all sensors are experiencing the same stimulus. One of the best ways to ensure like-excitations of all elements is to geometrically locate them in close proximity. Minimizing the spatial separation is a good way to ensure uniform stimulus of all sensors in the array. A MEMS cluster of elements could all be on the same substrate where on the order of a thousand elements could be in one square millimeter.

Figure 3:
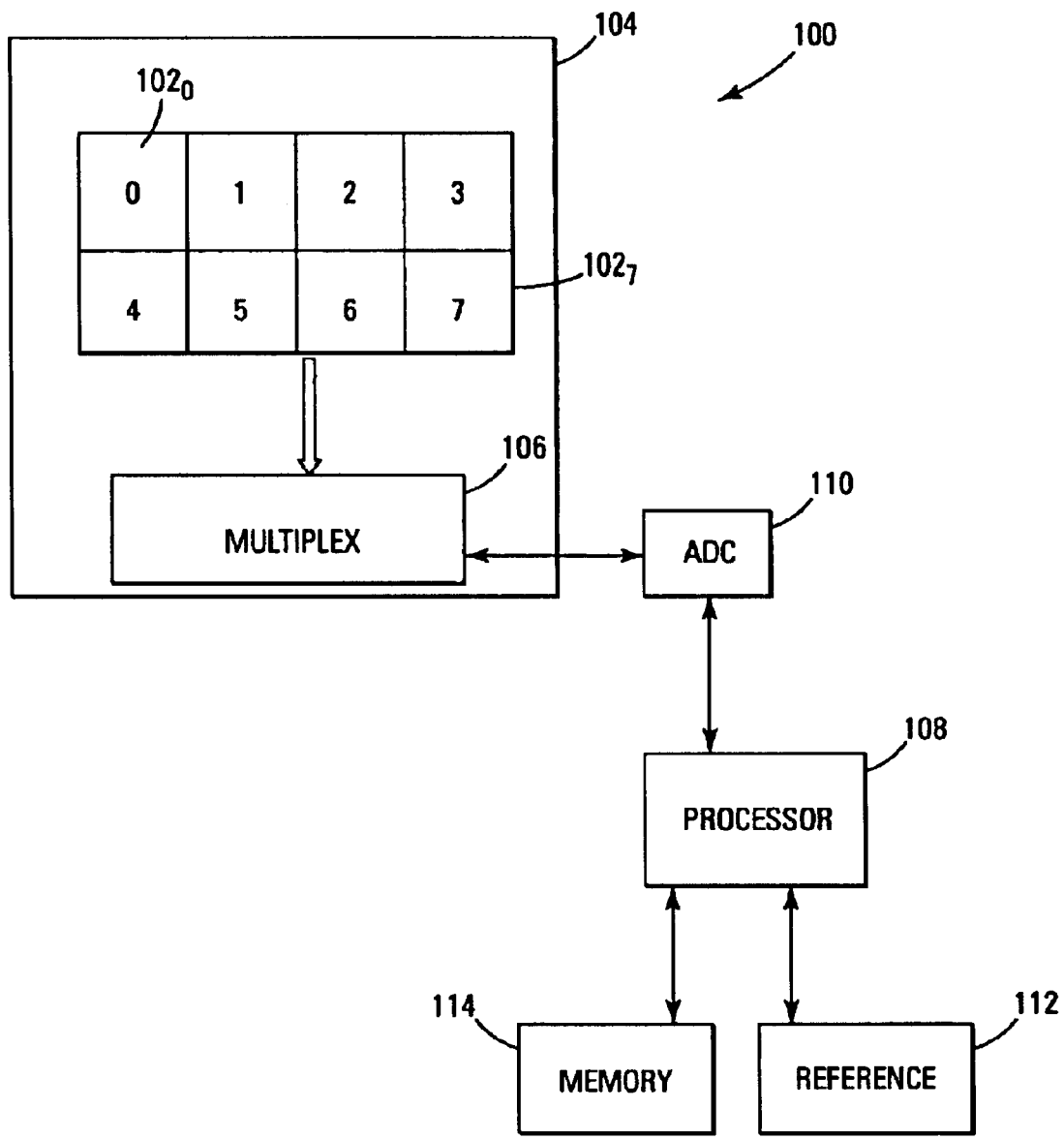
FIG. 3 illustrates a transducer of one embodiment of the present invention.

Referring to FIG. 3, a transducer 100 of one embodiment of the present invention is described. The transducer includes eight independent sensors $102_0$–$102_7$, such as pressure sensors. In one embodiment, the sensors are Lucas NovaSensor NPP-301 0–15 PSI surface mount pressure sensors. The sensors are located in a housing 104 such that they are in close proximity to each other. An eight channel multiplexer 106 is located in the housing and couples the sensors to an external processor 108. In one embodiment, the processor is an Analog Devices ADU816 and contains peripherals necessary to complete the transducer. For example, a 16-bit analog-to-digital converter (ADC) 110, a bandgap voltage reference 112, non-volatile memory 114, and a serial communications port.

In operation, the processor cycles through the multiplexer to measure the output voltage from each sensor. The output voltage is converted to a pressure reading using a linear calibration weight, or coefficient for the sensor. The coefficients are calculated as explained above and stored in non-volatile memory 114, see algorithm [2.2]. The pressure measurements are then entered into the multiple sensor algorithm [2.3] and a single pressure value is provided.

CONCLUSION

A multi-sensor transducer and processing method have been described to allow insitu monitoring of the senor accuracy and transducer 'health'. In one embodiment, the transducer has multiple sensors to provide corresponding output signals in response to a stimulus, such as pressure. A processor applies individual weight factors to reach of the output signals and provide a single transducer output that reduces the contribution from inaccurate sensors. The weight factors can be updated and stored. The processor can use the weight factors to provide a 'health' of the transducer based upon the number of accurate versus in-accurate sensors in the transducer.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A transducer comprising:
   a plurality of sensors providing a plurality of corresponding output signals in response to a stimulus; and
   a processor for calculating a health of the transducer by applying a plurality of weight factors to each of the plurality of corresponding output signals for calculating a number of inaccurate sensors of the plurality of sensors and for providing a single transducer output.

2. The transducer of claim 1 further comprising a multiplex circuit to selectively couple the plurality of corresponding output signals to the processor.

3. The transducer of claim 1 wherein the processor uses the weight factors of the plurality of sensors to identify a transducer failure.

4. A transducer comprising:
   a plurality of sensors to provide a plurality of corresponding output signals in response to a stimulus;
   a processor to apply a plurality of weight factors to each of the plurality of corresponding output signals and provide a single transducer output; and
   said transducer having the weight factors for each of the plurality of sensors calculated by $$(W_i)^{-1} = \frac{1}{2N}\sum_{j=1}^{N}\left(\frac{x_i}{x_j} + \frac{x_j}{x_i}\right),$$

where $W_i$ is the corresponding weight factor for sensor i providing output signal $x_i$.

5. The transducer of claim 4 wherein the single transducer output, Xoutput, is calculated by $$X_{Output} = \frac{\sum_{i=1}^{N} x_i W_i}{\sum_{j=1}^{N} W_j}.$$

6. A transducer comprising:
   a plurality of N sensors for providing a plurality of corresponding output signals in response to a stimulus;
   a memory for storing a plurality of weight factors corresponding to the plurality of sensors;
   a processor for calculating the health of the transducer by applying a plurality of weight factors to each of the plurality of corresponding output signals for calculating a number of inaccurate sensors of the plurality of sensors and providing a single transducer output; and
   a multiplex circuit for selectively coupling the plurality of corresponding output signals to the processor.

7. The transducer of claim 6 wherein the plurality of sensors are pressure sensors.

8. A transducer comprising:
   a plurality of N sensors to provide a plurality of corresponding output signals in response to a stimulus;
   a memory to store a plurality of weight factors corresponding to the plurality of sensors;
   a processor to apply a plurality of weight factors to each of the plurality of corresponding output signals and provide a singe transducer output;
   a multiplex circuit to selectively couple the plurality of corresponding output signals to the processor; and
   said transducer having the plurality of weight factors for each of the plurality of sensors is calculated by $$(W_i)^{-1} = \frac{1}{2N}\sum_{j=1}^{N}\left(\frac{x_i}{x_j} + \frac{x_j}{x_i}\right),$$

where $W_i$ is the corresponding weight factor for sensor i providing output signal $x_i$, and the single transducer output, Xoutput, calculated by $$X_{Output} = \frac{\sum_{i=1}^{N} x_i W_i}{\sum_{j=1}^{N} W_j}.$$

9. A method of providing an output from a multiple sensor transducer comprising:
   sampling an output signal from each of the multiple sensors, wherein the multiple sensors are N sensors;
   determining a weight factor for each sensor based upon the sampled output signals, wherein the weight factor represents an accuracy level of the corresponding sensor;
   calculating a single output signal by applying the weight factors to the sampled output signals;
   calculating a health of the transducer by calculating a number of inaccurate sensors of the multiple sensors.

10. The method of claim 9 further comprises:
    storing the weight factors for subsequent use; and
    updating the stored weight factors such that the transducer learns which sensors of the N sensors are reliable and which are unreliable via the weight factors.

11. A method of testing a multiple sensor transducer comprising:
    sampling an output signal from each of the multiple sensors;
    determining a weight factor for each sensor based upon the sampled output signals, wherein the weight factor represents an accuracy level of the corresponding sensor; and
    calculating a health of the transducer by calculating a number of inaccurate sensors of the multiple sensors.

12. The method of claim 11 wherein the multiple sensors are N sensors, and the weight factors are calculated by the following algorithm, $$(W_i)^{-1} = \frac{1}{2N}\sum_{j=1}^{N}\left(\frac{x_i}{x_j} + \frac{x_j}{x_i}\right),$$

where $W_i$ is the corresponding weight factor for sensor i providing output signal $x_i$.

13. The method of claim 11 further comprises:

applying the weight factor to each of the sampled output signals; and calculating a single transducer output using the weighted output signals.

14. The method of claim 13 wherein the weight factors are calculated by the following algorithm, $$(W_i)^{-1} = \frac{1}{2N}\sum_{j=1}^{N}\left(\frac{x_i}{x_j} + \frac{x_j}{x_i}\right),$$

where $W_i$ is the corresponding weight factor for sensor i providing output signal $x_i$.

15. The method of claim 14 wherein the single output signal, Xoutput, is calculated by the following algorithm, $$X_{output} = \frac{\sum_{i=1}^{N} x_i W_i}{\sum_{j=1}^{N} W_j}.$$

* * * * *